(12) United States Patent
Brunk

(10) Patent No.: US 6,986,807 B2
(45) Date of Patent: Jan. 17, 2006

(54) DESICCANT BOTTLE CAP

(76) Inventor: S. Fred Brunk, 2929 E. 69th St., Tulsa, OK (US) 74136-4541

( * ) Notice: Subject to any disclaimer, the term of this patent is extended or adjusted under 35 U.S.C. 154(b) by 29 days.

(21) Appl. No.: 10/772,320

(22) Filed: Feb. 6, 2004

(65) Prior Publication Data

US 2005/0172814 A1  Aug. 11, 2005

(51) Int. Cl.
*B01D 53/02* (2006.01)
*B01D 53/26* (2006.01)
*B65D 81/26* (2006.01)

(52) U.S. Cl. .......................... 96/147; 96/148; 96/153; 206/204; 206/223; 215/227; 215/228

(58) Field of Classification Search ............... 96/117.5, 96/135, 147, 148, 153, 154; 206/0.7, 204; 215/227, 228, 261, 308, 316
See application file for complete search history.

(56) References Cited

U.S. PATENT DOCUMENTS

| | | | | |
|---|---|---|---|---|
| 1,050,706 A | * | 1/1913 | Taylor | 96/118 |
| 1,655,248 A | * | 1/1928 | Sharp | 96/119 |
| 1,698,320 A | * | 1/1929 | Sharp | 96/118 |
| 2,317,882 A | * | 4/1943 | Boesel | 96/148 |
| 2,362,796 A | * | 11/1944 | Boesel | 312/31.1 |
| 2,548,168 A | * | 4/1951 | Luce | 96/148 |
| 2,548,780 A | * | 4/1951 | Gary et al. | 264/143 |
| 2,676,078 A | * | 4/1954 | Young | 96/148 |
| 2,690,946 A | * | 10/1954 | Roehrl | 312/31.1 |
| 2,852,326 A | * | 9/1958 | Westlake, Jr. | 312/31.1 |
| 3,035,730 A | * | 5/1962 | Walker et al. | 215/228 |
| 3,081,137 A | * | 3/1963 | Kolokythas | 96/148 |
| 3,254,784 A | | 6/1966 | Lancesseur | |
| 3,567,085 A | * | 3/1971 | Flores | 224/604 |
| 3,918,578 A | * | 11/1975 | Cullen et al. | 206/204 |
| 3,990,872 A | * | 11/1976 | Cullen | 96/6 |
| 4,146,277 A | | 3/1979 | Santoro | |
| 4,279,350 A | | 7/1981 | King | |
| 4,287,995 A | | 9/1981 | Moriya | |
| 4,350,508 A | | 9/1982 | Santoro et al. | |
| 4,394,144 A | | 7/1983 | Aoki | |
| 4,421,235 A | * | 12/1983 | Moriya | 206/524.2 |
| 4,505,727 A | * | 3/1985 | Cullen et al. | 96/147 |
| 4,545,492 A | | 10/1985 | Firestone | |
| 4,756,436 A | * | 7/1988 | Morita et al. | 215/228 |
| 4,834,234 A | * | 5/1989 | Sacherer et al. | 206/204 |
| 4,840,280 A | * | 6/1989 | Schvester | 215/228 |
| 5,009,308 A | * | 4/1991 | Cullen et al. | 206/204 |

(Continued)

FOREIGN PATENT DOCUMENTS

EP  0222102  5/1987

(Continued)

*Primary Examiner*—Robert C. Spitzer

(57) ABSTRACT

The desiccant bottle cap includes a cap structure and a desiccant material adhered thereto. The desiccant bottle cap is preferably used to cover a medicine bottle so that the efficiency of the medicine disposed therein will not be impaired by moisture resulting from humid air entering the bottle. In one embodiment, the desiccant bottle cap includes a bottle cap and a desiccant packet affixed to an interior surface thereof. In another embodiment, the desiccant bottle cap includes a bottle cap, a bottle cap liner adhered to an interior surface of the bottle cap, and a desiccant packet adhered to a top surface of the desiccant liner. In yet another embodiment, loose desiccant material or a disk of desiccant material is sandwiched between a bottle cap liner and a porous material to create a bottle cap insert for removable insertion into a bottle cap.

9 Claims, 7 Drawing Sheets

U.S. PATENT DOCUMENTS

| | | | |
|---|---|---|---|
| 5,766,660 A * | 6/1998 | Lee et al. | 426/118 |
| 5,894,949 A * | 4/1999 | Taskis et al. | 215/247 |
| 5,934,494 A * | 8/1999 | Takahashi et al. | 215/347 |
| 6,231,815 B1 * | 5/2001 | Bainczyk et al. | 422/102 |
| 6,274,209 B1 | 8/2001 | Pagidas et al. | |
| 6,571,942 B2 * | 6/2003 | Riemenschneider et al. | 206/204 |
| 6,649,086 B2 * | 11/2003 | Payne et al. | 252/194 |
| 2003/0121418 A1 * | 7/2003 | Loop et al. | 96/117.5 |

FOREIGN PATENT DOCUMENTS

| | | |
|---|---|---|
| EP | 0 978 306 | 2/2000 |
| GB | 2 098 501 | 11/1982 |

* cited by examiner

DESICCANT BOTTLE CAP

BACKGROUND OF THE INVENTION

1. Field of the Invention

The present invention relates to bottle caps for medicine bottles, and more particularly, to a bottle cap having a desiccant retained therein for preventing contamination of the medicine by moisture.

2. Description of the Related Art

Many drugs are typically bottled in an atmosphere of very low humidity to avoid absorption of moisture within the container. However, each time the bottle is opened by the consumer for removal of a portion of the contents, atmospheric air is admitted to the container. This results in an increase in humidity within the bottle and eventual deterioration of the contents. In order to maintain a moisture-free atmosphere within the bottle after it has been opened, packagers frequently place therein a pill of desiccant material or a moisture-permeable capsule containing a desiccant. However, the danger always exists that the consumer may inadvertently remove or even take the desiccant pill or capsule. Since these desiccants often contain a cobalt salt to indicate exposure to humid atmospheres, ingestion of such materials can result in discomfort or serious illness.

Consequently, a bottle cap having a desiccant material attached thereto in a manner which prevents its becoming readily detached is desirable. While prior attempts have been made to provide a bottle cap of this type, most cap structures of this type are configured to include a desiccant chamber consisting of a separate unit mechanically integrated with the complete cap. Such structures have not been accepted by the drug and chemical packaging houses because they involve the use of caps of extra size or shape. Their use would entail considerable expense and trouble in adapting present machinery to accommodate them and in making and handling cartons in which the bottles of packaged material are packed. The inconvenience of such change has been so great that the present cap structures of this type have not been acceptable.

U.S. Pat. No. 2,317,882, issued Apr. 27, 1943 to C. F. Boesel, discloses closure caps for receptacles containing dry medicinal materials. The cap includes a separate housing made of plastic or metal for receiving an absorbent or dehydrating means to protect the medicinal materials from moisture.

U.S. Pat. No. 3,035,730, issued May 22, 1962 to P. G. Walker, discloses a bottle cap having a desiccant chamber formed in a central portion of the liner and a desiccant material retained therein by means of a closure member.

U.S. Pat. No. 3,254,784, issued Jun. 7, 1966 to F. Lancesseur, discloses a dehydrating stopper having a washer disposed between the stopper bottom and a pad of dehydrating product, the washer having printed thereon the mark or trade name of the product contained in the bottle or other container which is to be closed by means of the stopper.

U.S. Pat. No. 4,350,508, issued Sep. 21, 1982 to Santoro et al., discloses a desiccant cap. The desiccant cap is a transparent enclosure having an internal cavity divided into two portions, the first of which is designed to accept and seal a container. The second is designed to accept and hold a mixture of a desiccant and a humidity sensitive color indicator. The first and second portions of the cavity are separated by a barrier wall which contains a filter in the central area of the wall. The filter is formed from a wicking polymer.

U.S. Pat. No. 4,545,492, issued Oct. 8, 1985 to R. A. Firestone, discloses a device for maintaining dry conditions in vessels. The device is a cap or stopper having a hollow section to contain a drying agent, a nonporous top member having at least one pinhole therein and a porous bottom member.

Other patents related to desiccant holding devices for medicine bottles include U.S. Pat. No. 6,274,209, issued Aug. 14, 2001 to Pagidas et al. (semipermeable venting closure); U.S. Pat. No. 4,394,144, issued Jul. 19, 1983 to Y. Aoki (dehumidifying container); U.S. Pat. No. 4,287,995, issued Sep. 8, 1981 to T. Moriya (container sealing member with oxygen absorbent); U.S. Pat. No. 4,279,350, issued Jul. 21, 1981 to R. V. King (closure with oxygen scavenging system); U.S. Pat. No. 4,146,277, issued Mar. 27, 1979 to D. S. Santoro (desiccant cap); United Kingdom Patent No. 2,098,501, published Nov. 24, 1982 (dehumidifying container); European Patent No. 222,102, published May 20, 1987 (closure with a desiccant); and European Patent No. 978,306, published Feb. 9, 2000.

None of the above inventions and patents, taken either singly or in combination, is seen to describe the instant invention as claimed. Thus a desiccant bottle cap solving the aforementioned problems is desired.

SUMMARY OF THE INVENTION

The desiccant bottle cap of the present invention relates to a cap structure having a desiccant material or a desiccant containing packet adhered thereto. The desiccant bottle cap is preferably used to cover a medicine bottle so that the efficiency of the medicine disposed therein will not be impaired by moisture resulting, viz., from humid air entering the bottle. In one embodiment, the desiccant bottle cap includes a bottle cap and a desiccant packet affixed to an interior surface thereof. In another embodiment, the desiccant bottle cap includes a bottle cap, a bottle cap liner adhered to an interior surface of the bottle cap, and a desiccant packet adhered to a top surface of the desiccant liner. In yet another embodiment, loose desiccant material or a disk of desiccant material is sandwiched between a bottle cap liner and a porous material to create a bottle cap insert for removable insertion into a bottle cap.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
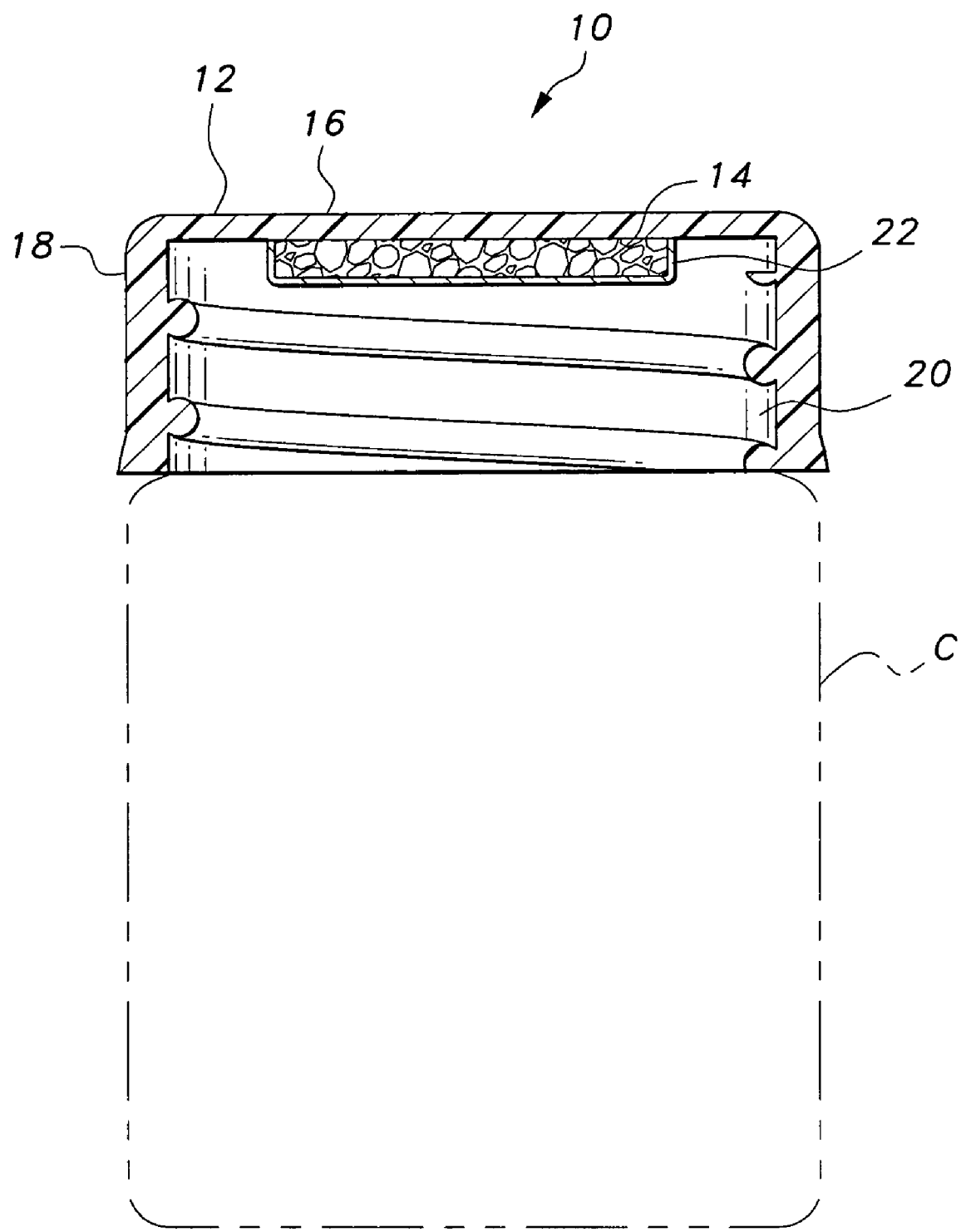
FIG. 1 is a cross-sectional view of a desiccant bottle cap according to a first embodiment of the present invention.

The present invention relates to a desiccant bottle cap, generally designated as 10 in the drawings, for sealing a container C and maintaining an environment relatively free from moisture within the container C. As can be seen in FIG. 1, the desiccant bottle cap 10 includes a cap structure 12 and a desiccant material 14 adhered thereto. The cap structure 12 is a cup-like member having a closed end 16, a rim 18, and a threaded interior surface 20 which engages the exterior threads around the mouth of the bottle or container C. The cap structure 12 may be made from plastic, metal or any other suitable material. While the desiccant bottle cap 10 is shown to be threaded in the drawings, suitable lugs, ribs, a childproof fastener, or other closures familiar to those skilled in the art could be used for attaching the desiccant bottle cap 10 to the container C.

Figure 2:
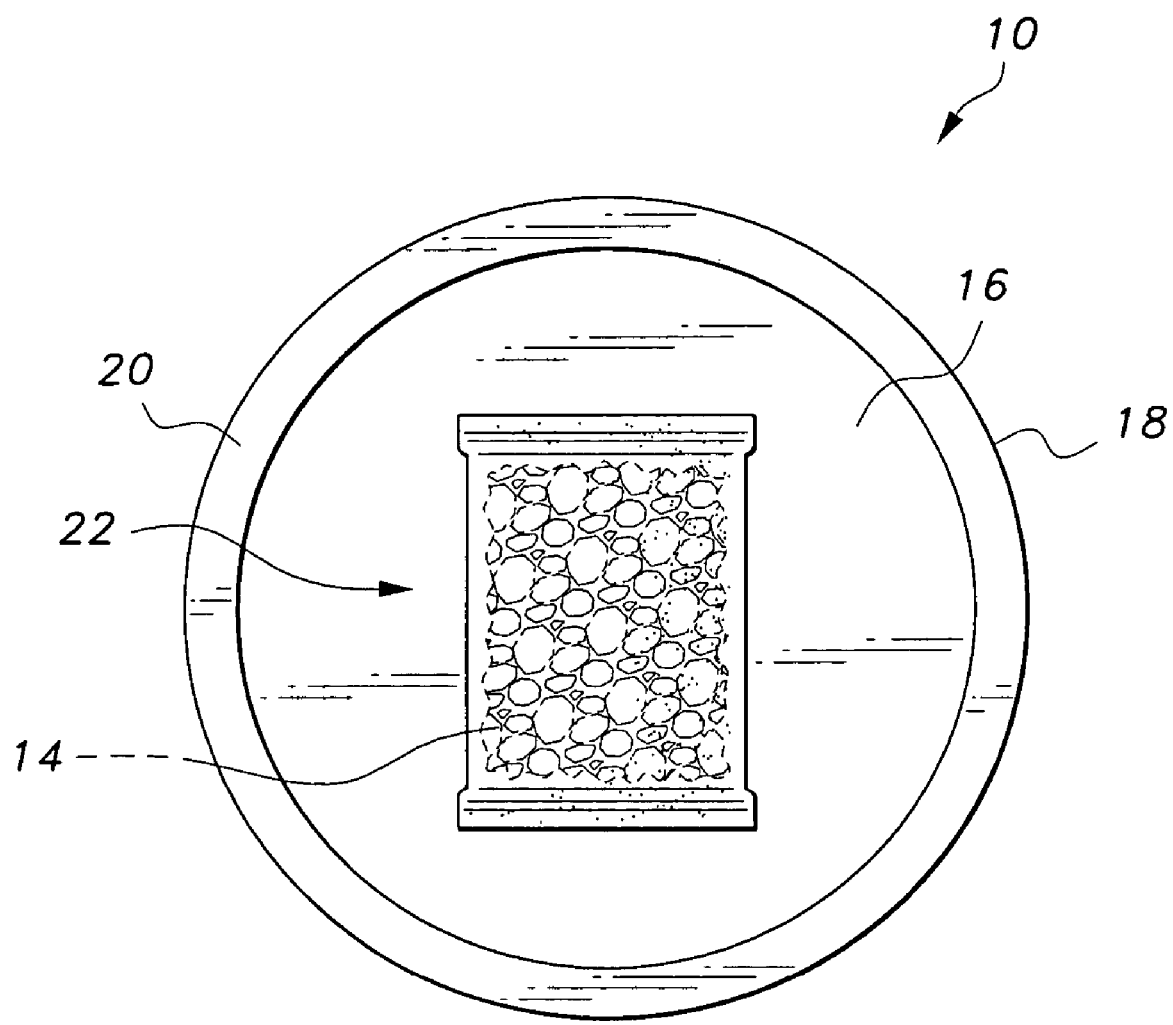
FIG. 2 is a plan view of an inner surface of the desiccant bottle cap according to the first embodiment of the present invention.

The desiccant material 14 may include silica gel or any other suitable desiccant. As is shown more clearly FIG. 2, the desiccant material 14 is provided in a desiccant packet 22 which is affixed to the closed end 16 of the cap structure 12. The desiccant packet 22 can be any suitable desiccant packet known in the art and can be made in any suitable size and shape. Desiccant packets are especially effective because they are extremely durable, can be easily adhered to conventional bottle caps without altering the bottle cap's structure or manufacturing process, and have high moisture adsorbing capacity. Once attached to the container C, the desiccant bottle cap 10 ensures that medicine disposed within the container C will not be damaged by moisture from humid air entering the container C. Also, since the desiccant packet 22 is securely attached to the cap 10, it is less likely that desiccant material 14 will escape from the container C when the container C is uncovered and medicine is being dispensed.

Figure 3:
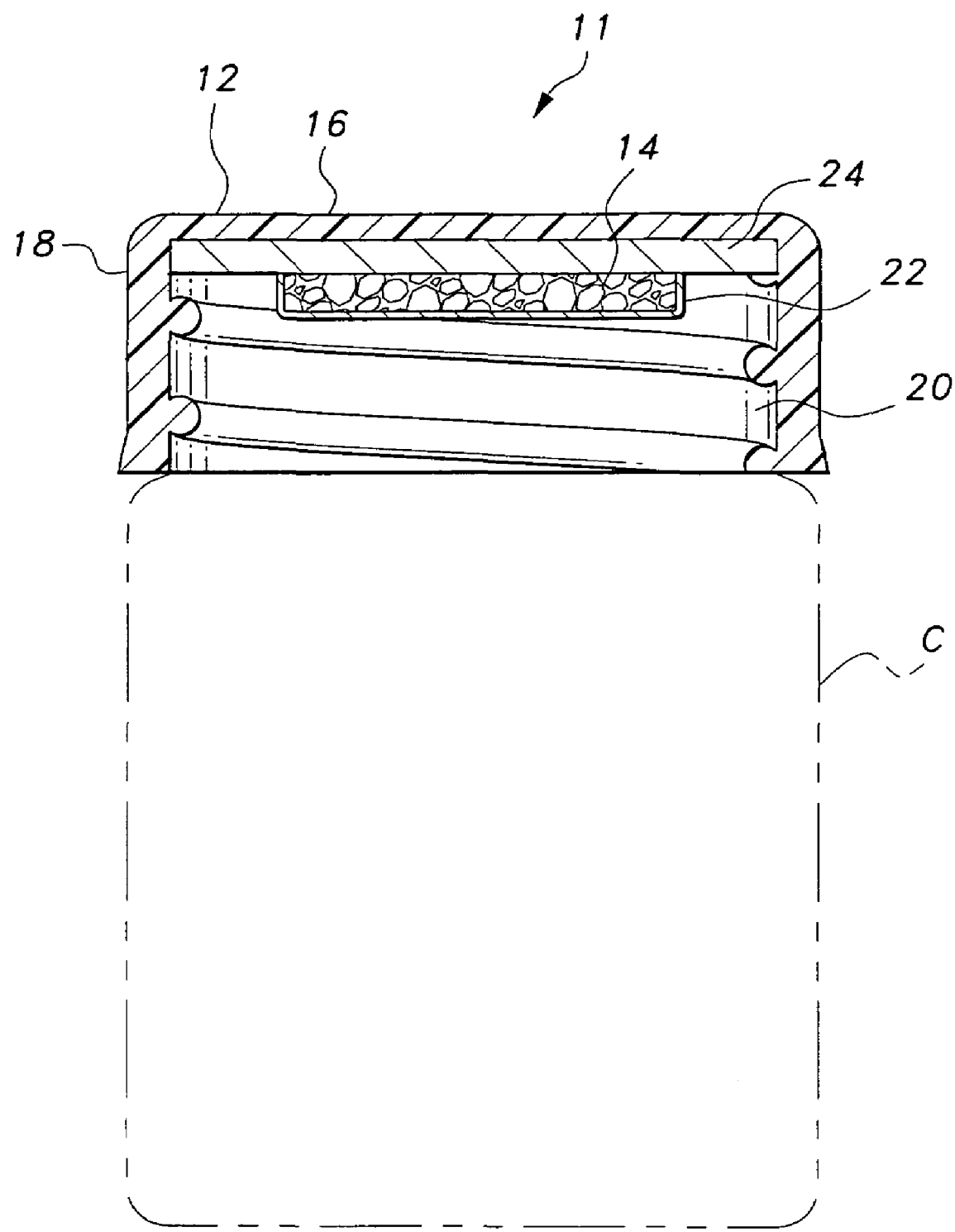
FIG. 3 is a cross-sectional view of a desiccant bottle cap according to a second embodiment of the present invention.
Figure 4:
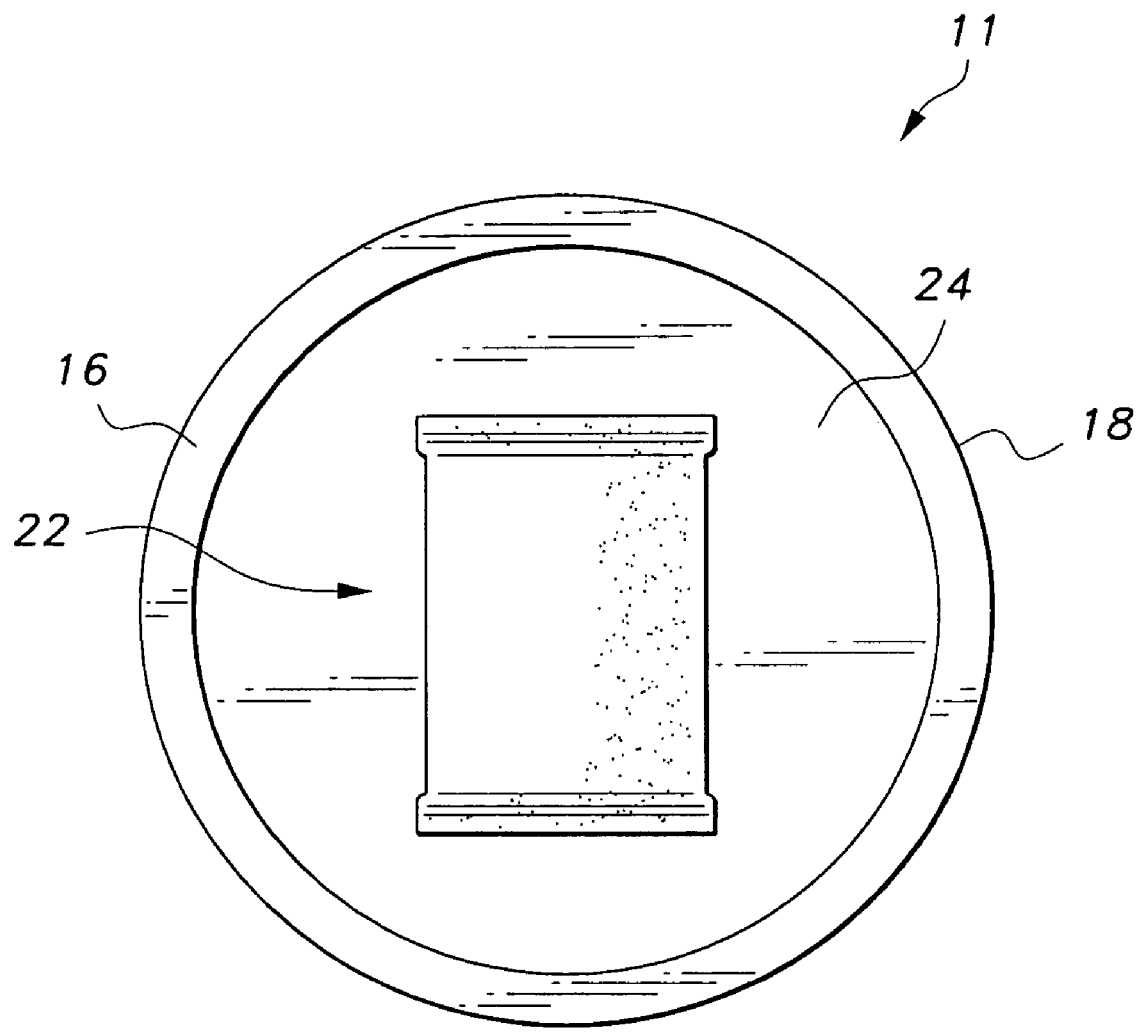
FIG. 4 is a plan view of an inner surface of the desiccant bottle cap according to the second embodiment of the present invention.

FIGS. 3 and 4 depict another embodiment of the desiccant bottle cap, generally designated as 11 in the drawings. The desiccant bottle cap 11 is identical to the desiccant bottle cap 10, except that the desiccant bottle cap 11 includes a bottle cap liner 24 disposed between the closed end 16 of the cap 12 and the desiccant packet 22. The bottle cap liner 24 can be made from any suitable material. Preferably, the bottle cap liner 24 is made from cardboard. Identical components will not be further described.

Figure 5:
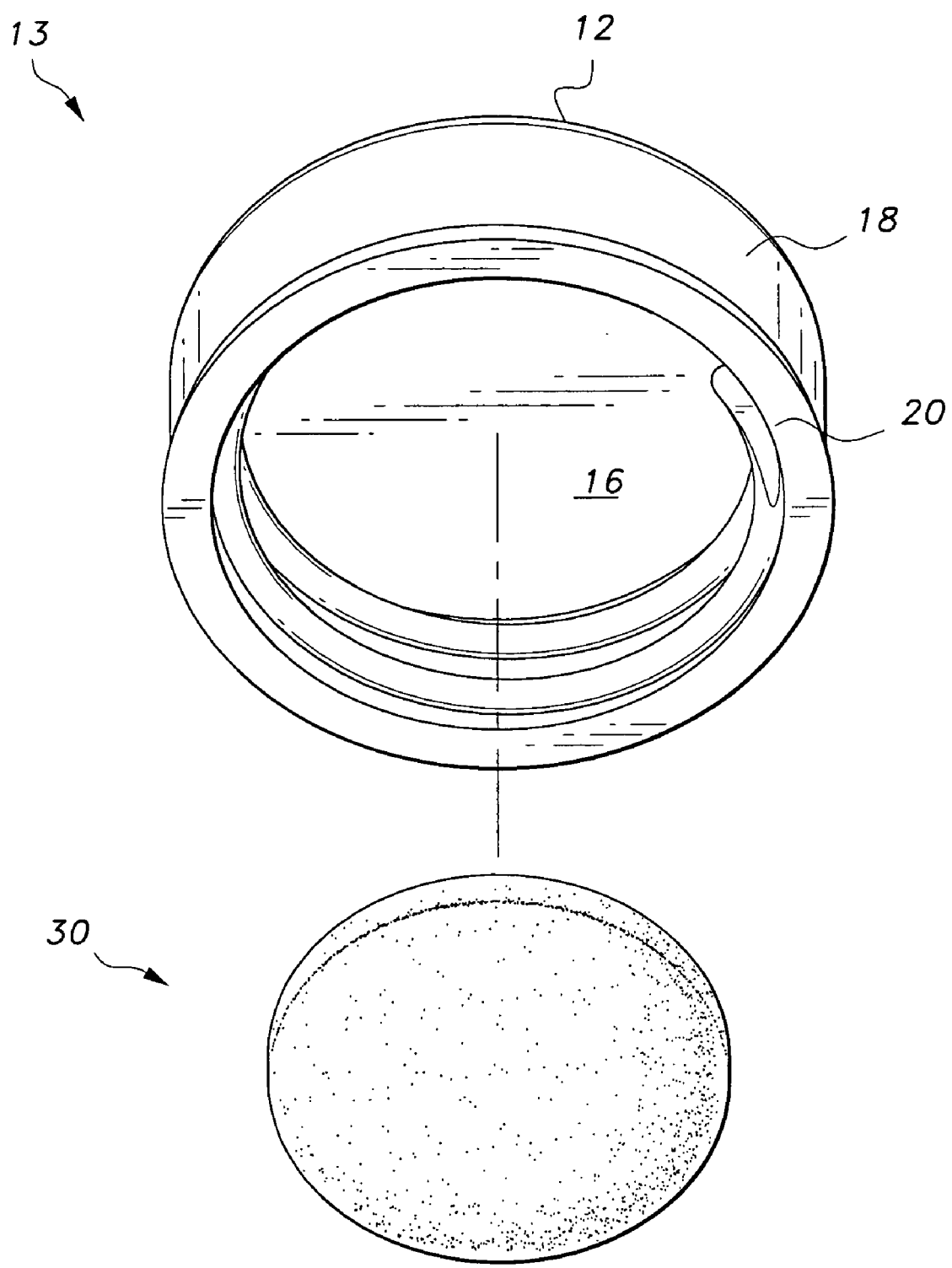
FIG. 5 is an exploded bottom perspective view of a desiccant bottle cap according to a third embodiment of the present invention.
Figure 6:
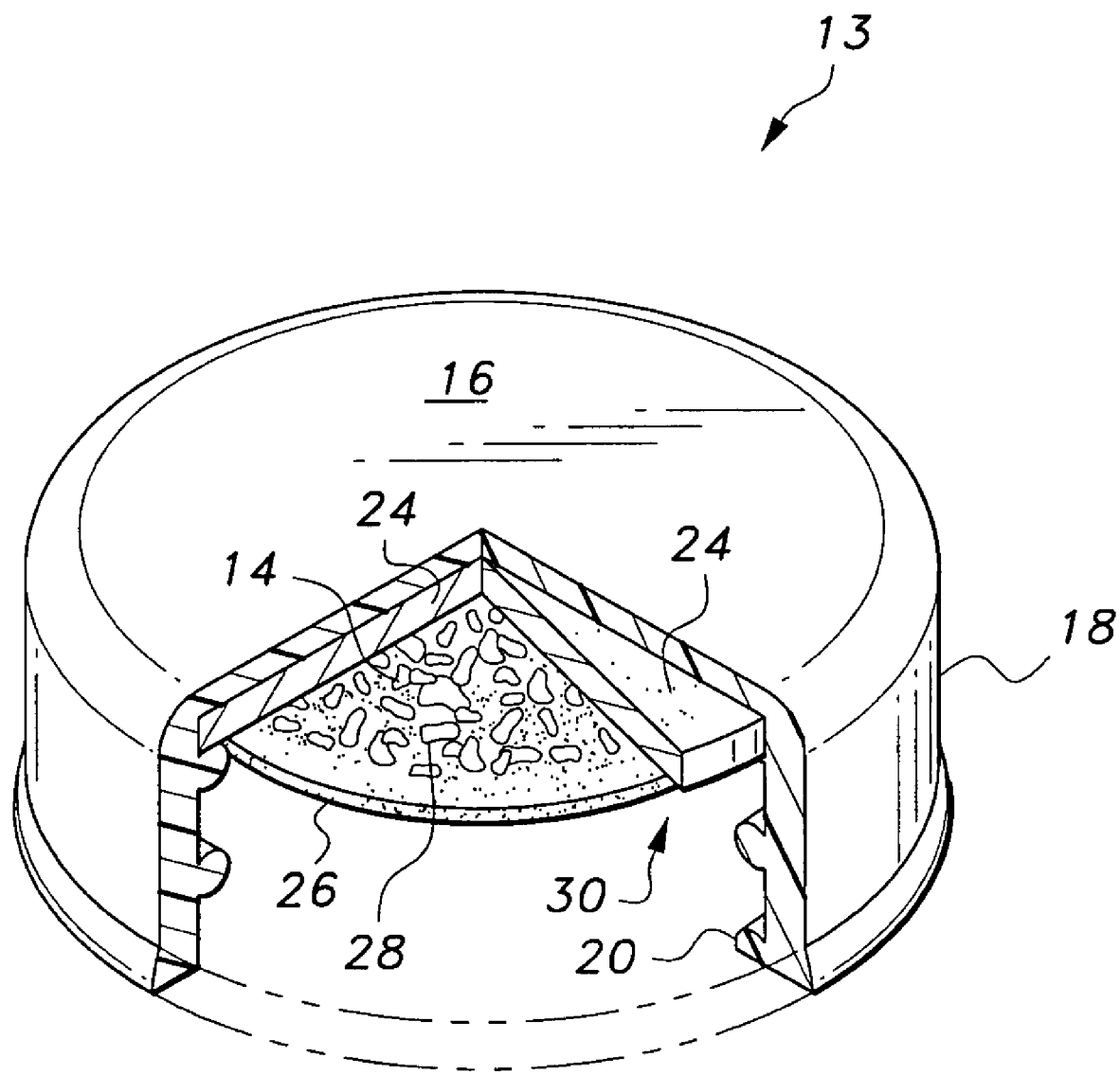
FIG. 6 is a perspective view of a desiccant bottle cap, partially broken away and in section, according to the third embodiment of the present invention.
Figure 7:
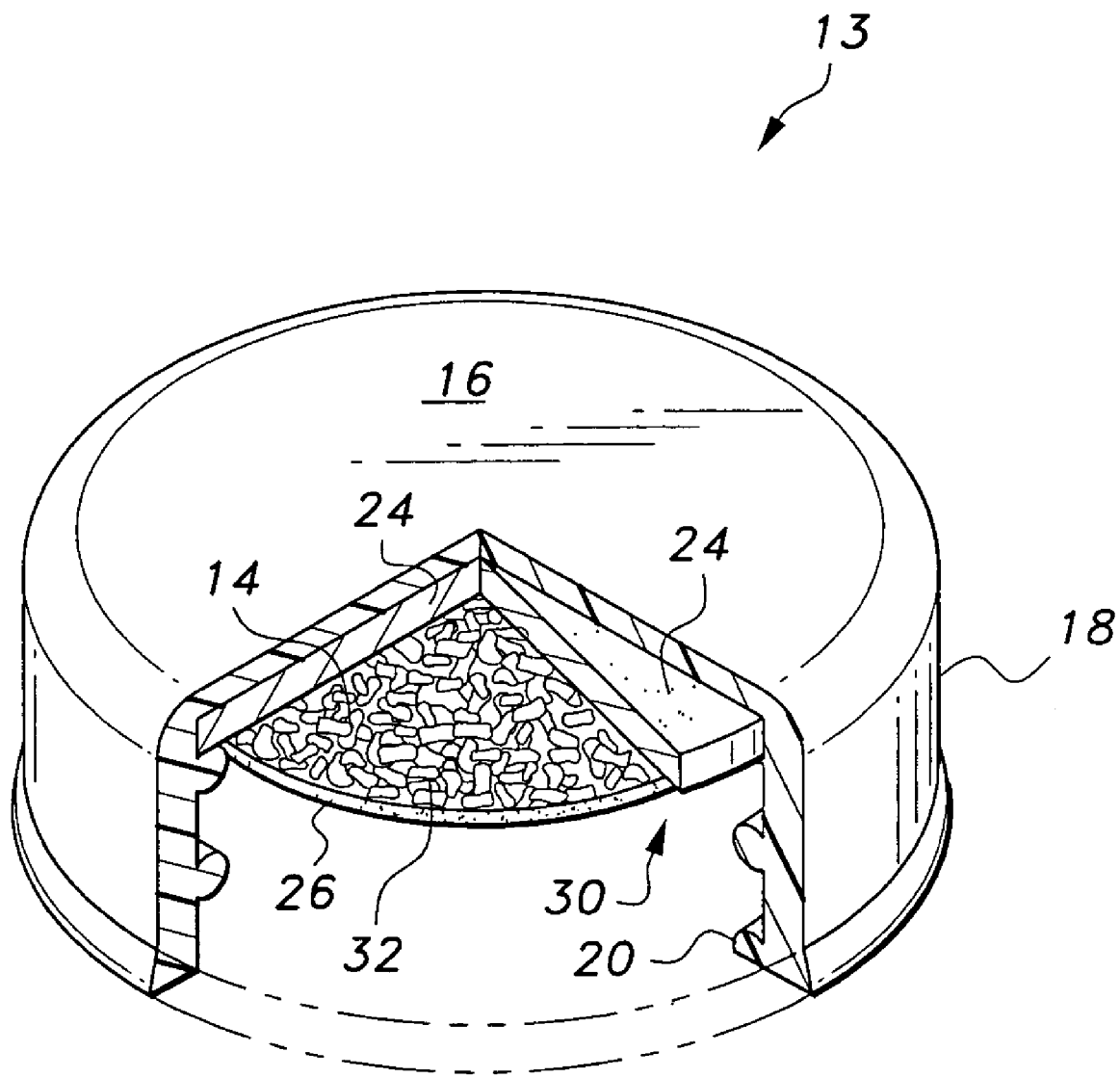
FIG. 7 is a cut-away view of a desiccant bottle cap according to the third embodiment of the present invention.

FIG. 5 depicts yet another embodiment of the desiccant bottle cap, generally designated as 13 in the drawings. The desiccant bottle cap 13 is identical to the desiccant bottle cap 11 except that instead of a desiccant packet 22, the desiccant bottle cap 13 includes a bottle cap insert 30 for snap fitting into the cap structure 12 adjacent the closed end 16. As can be seen in FIGS. 6–7, the bottle cap insert 30 includes the bottle cap liner 24, a porous material 26 attached to the bottle cap liner 24 and a desiccant material 14 which is sandwiched between the bottle cap liner 24 and the porous material 26. The porous material 26 may be paper or any other suitable porous material. The desiccant material 14 in this embodiment can be provided as loose particles of desiccant 28, as shown in FIG. 6, or desiccant particles which are adhered together to form a desiccant disk 32, as shown in FIG. 7.

It is to be understood that the present invention is not limited to the embodiments described above, but encompasses any and all embodiments within the scope of the following claims.

I claim:

1. A desiccant bottle cap, comprising:
   a bottle cap having a closed end and a rim depending from the closed end;
   a desiccant bottle cap insert, said desiccant bottle cap insert comprising
   a flat, cardboard cap liner having a first surface and a second surface, said cap liner disposed within the closed end of said bottle cap with said cap liner first surface facing said closed end of said bottle cap;
   a desiccant packet having a first side, a second side, and an interior volume;
   said interior volume of said desiccant packet containing a desiccant material; and
   said desiccant packet first side being adhered to said second surface of said cap liner.

2. The desiccant bottle cap according to claim 1, wherein the rim is internally threaded for attachment to a threaded bottle.

3. The desiccant bottle cap according to claim 1, wherein said bottle cap is made from plastic.

4. The desiccant bottle cap according to claim 1, wherein said bottle cap is made from metal.

5. A desiccant bottle cap, comprising:
   a bottle cap having a closed end and a rim depending from the closed end;
   a desiccant bottle cap insert forming a snap fit into the closed end of said bottle cap;
   the desiccant bottle cap insert comprising a flat, cardboard cap liner having a first surface facing toward said closed end of said bottle cap, and a second surface facing away from said closed end of said bottle cap;
   a porous, paper material attached to the cap liner second surface; and
   a desiccant material sandwiched between the cap liner second surface and the porous, paper material.

6. The desiccant bottle cap according to claim 5, wherein said desiccant material is a loose, aggregate material.

7. The desiccant bottle cap according to claim 5, wherein said desiccant material is provided as a disk.

8. A desiccant bottle cap insert for insertion into a bottle cap having a closed end and a rim depending from the closed end, said desiccant bottle cap insert comprising:
   a flat, cardboard cap liner having a first surface and a second surface, for placement within the closed end of said bottle cap with said cap liner first surface facing said closed end of said bottle cap;
   a desiccant packet having a first side, a second side, and an interior volume;
   said interior volume of said desiccant packet containing a desiccant material; and
   said desiccant packet first side being adhered to said second surface of said cap liner.

9. A desiccant bottle cap insert for insertion into a bottle cap having a closed end and a rim depending from the closed end, said desiccant bottle cap insert configured to form a snap fit into the closed end of said bottle cap, said insert comprising:
   a flat, cardboard cap liner having a first surface facing toward said closed end of said bottle cap, and a second surface facing away from said closed end of said bottle cap, when said insert is snapped into the closed end of said bottle cap;
   a porous, paper material attached to said cap liner second surface; and
   a desiccant material sandwiched between said cap liner second surface and said porous, paper material.

\* \* \* \* \*